(12) United States Patent
Kouladjie et al.

(10) Patent No.: US 9,734,508 B2
(45) Date of Patent: Aug. 15, 2017

(54) CLICK FRAUD MONITORING BASED ON ADVERTISING TRAFFIC

(75) Inventors: Kam Kouladjie, Seattle, WA (US);
Haitao Song, Sammamish, WA (US);
Baiju Nair, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 13/406,532

(22) Filed: Feb. 28, 2012

(65) Prior Publication Data
US 2013/0226692 A1  Aug. 29, 2013

(51) Int. Cl.
*G06Q 30/02* (2012.01)

(52) U.S. Cl.
CPC .................... *G06Q 30/02* (2013.01)

(58) Field of Classification Search
CPC ..................................... G06Q 30/02
See application file for complete search history.

(56) References Cited

U.S. PATENT DOCUMENTS

| | | | | |
|---|---|---|---|---|
| 7,657,626 B1 * | 2/2010 | Zwicky | ............. | G06Q 30/02 705/51 |
| 7,734,502 B1 * | 6/2010 | Yehoshua | ............. | G06Q 30/02 705/14.47 |
| 8,024,463 B2 | 9/2011 | Hanson et al. | | |
| 8,856,207 B2 * | 10/2014 | Owen | ............. | G06Q 30/02 709/203 |
| 9,092,800 B2 * | 7/2015 | Owen | ............. | G06Q 30/02 |
| 2005/0235030 A1 | 10/2005 | Lauckhart et al. | | |
| 2006/0136294 A1 * | 6/2006 | Linden | ............. | G06Q 30/0257 705/14.47 |
| 2007/0061211 A1 * | 3/2007 | Ramer | ............. | G06Q 20/12 705/25 |
| 2007/0074169 A1 * | 3/2007 | Chess | ............. | G06F 21/54 717/126 |
| 2007/0179849 A1 * | 8/2007 | Jain | ............. | G06Q 30/02 705/14.41 |
| 2007/0255821 A1 * | 11/2007 | Ge et al. | ............. | 709/224 |
| 2008/0010166 A1 | 1/2008 | Yang et al. | | |

(Continued)

OTHER PUBLICATIONS

Majumdar et al., Addressing Click Fraud in Content Delivery Systems, 2007, 26th IEEE International Conference on Computer Communications, all pages.*

(Continued)

*Primary Examiner* — Jacob C. Coppola
(74) *Attorney, Agent, or Firm* — Law Offices of Richard Chi; Richard Chi (57) ABSTRACT

Various techniques of monitoring for click fraud in an online advertising system are disclosed herein. In one embodiment, a web server includes a traffic module configured to detect a request from a client device, an analysis module configured to perform a determination if the detected request includes a client ID. The web server also includes a calculation module configured to determine a count of requests with client ID and a count of requests without client ID based on the determination by the analysis module. The web server further includes a fraud module configured to monitor for click fraud based at least in part on the determined count of requests with client ID and/or count of requests without client ID from the calculation module and the determination by the analysis module.

17 Claims, 10 Drawing Sheets

(56) References Cited

U.S. PATENT DOCUMENTS

| | | | |
|---|---|---|---|
| 2008/0114624 A1* | 5/2008 | Kitts | G06Q 30/0248 705/14.47 |
| 2008/0270154 A1 | 10/2008 | Klots et al. | |
| 2008/0281606 A1 | 11/2008 | Kitts et al. | |
| 2009/0112978 A1* | 4/2009 | Owen | G06Q 30/02 709/203 |
| 2009/0125444 A1* | 5/2009 | Cochran et al. | 705/50 |
| 2009/0164269 A1* | 6/2009 | Gupta | G06F 21/552 705/14.47 |
| 2009/0299967 A1 | 12/2009 | Li et al. | |
| 2010/0313264 A1 | 12/2010 | Xie et al. | |
| 2011/0208862 A1 | 8/2011 | Maffione et al. | |
| 2014/0358675 A1* | 12/2014 | Owen | G06Q 30/02 705/14.45 |

OTHER PUBLICATIONS

Juels, et al., "Active Cookies for Browser Authentication", Retrieved at <<http://www.ravenwhite.com/files/activecookies--28_Apr_06.pdf>> RSA Laboratories and RavenWhite Inc., Apr. 28, 2006, pp. 18.

Caceres, et al., "Measurement and Analysis of IP Network Usage and Behavior", Retrieved at <<http://ieeexplore.ieee.org/stamp/stamp.jsp?tp=&arnumber=841839>> Communications Magazine, IEEE, May 2000, pp. 144-151.

"Web Analytics TV #23—The Holiday Episode", Retrieved at <<http://analytics.blogspot.com/>> Google Analytics, Dec. 23, 2011, pp. 11.

Stone-Gross, "Understanding Fraudulent Activities in Online Ad Exchanges", Retrieved at <<http://dl.acm.org/citation.cfm?id=2068843>> ACM SIGCOMM conference on Internet measurement conference, 2011, Nov. 2-4, 2011, pp. 279-294.

* cited by examiner

CLICK FRAUD MONITORING BASED ON ADVERTISING TRAFFIC

BACKGROUND

Pay per click ("PPC") is an Internet advertising model used to direct traffic to advertisers' websites. Based on such a model, webpage publishers display clickable advertisements in exchange for a fee from advertisers when a user clicks on the displayed advertisements. Often, an advertising network (e.g., Microsoft AdCenter®) can act as an intermediary between advertisers and publishers. The advertising network charges an advertiser for a click on its advertisement and pays the publisher who displays the advertisement.

One problem with PPC advertising is click fraud. Click fraud generally refers to the practice of a person (or a computer program) imitates a legitimate user's clicking on an advertisement for generating a charge per click without having actual interest in a target of the advertisement. Click fraud can be committed under different situations. For example, a publisher may commit click fraud by clicking on advertisements displayed on his/her own webpages to increase fees collected from an advertiser or advertising network. In another situation, a person or business may commit click fraud by repeatedly clicking on a competitor's advertisements with the intent of exhausting the competitor's advertising budget. Even though various detection and prevention techniques have been developed, click fraud remains a serious problem.

SUMMARY

The present technology is directed to analyzing aspects of advertising traffic in an online advertising system and monitoring click fraud based on results of the analysis. For example, one technique can include determining validity of advertising traffic by analyzing client identification ("client ID") of the received search requests. For instance, an online advertising system can track a number of requests corresponding to a particular client ID. If the number of requests with the same client ID exceeds a predetermined threshold over a period, the online advertising system can mark the received requests as invalid. In another instance, the online advertising system can compare the client IDs of received requests with those previously observed to correspond to a particular requesting source (e.g., identified by an IP address). If a number of the client IDs for the requesting source has been changing more frequently that a threshold, the online advertising system can also mark the received requests as invalid. Optionally, the online advertising system can also mark the particular requesting source as malicious.

In other examples, the present technology can also analyze anonymous search requests (i.e., requests without client IDs) based on corresponding publisher and/or advertiser identification. For instance, the online advertising system can track a number of requests that have client IDs and those without for a particular publisher (or advertiser). The online advertising system can calculate a ratio and/or percentage of anonymous requests to those with client IDs for the publisher (or advertiser). If the calculated ratio exceeds a corresponding threshold, the online advertising system can raise an alarm, mark the received anonymous requests as potentially invalid, and/or perform other suitable operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments of online advertising systems, components, modules, routines, and processes for monitoring click fraud are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1A-6B.

As used herein, the term "client ID" generally refers to information useful for identifying, recognizing, and/or otherwise classifying a user or a web browser. For example, a client ID can include a browser cookie (e.g., an HTTP cookie) used for an originating website to send state information (e.g., a packet of data) to a users browser. The user's browser then returns the state information to the originating site during subsequent visits. In other examples, a client ID can also include a query string embedded in a universal resource locator ("URL"), a hidden web form field, a local shared object ("LSO"), a document object model ("DOM") property of window.name, HTTP authentication information, and/or other suitable identification information. In further examples, a client ID may also include an IP address, alone or in addition to the foregoing identification information. Also used herein, the term "anonymous" generally refers to a state of lacking a corresponding client ID.

As discussed in the Background section, click fraud is a serious problem facing the PPC advertising model. As a result, advertisers, publishers, and advertising networks have worked to develop various monitoring and/or detection techniques. For example, one technique monitors for abnormally high number of clicks coming from one or a small group of computers based on IP addresses. However, as various detection techniques evolve, click fraud activities have become more sophisticated. Automated programs (e.g., clickbots) can now "spread out" clicks to a large number of computers. As a result, detection techniques based on a single aspect of advertising traffic may not be sufficient. As discussed in more detail below, the present technology includes techniques for analyzing multiple aspects of advertising traffic and monitoring and/or detecting click fraud based on the result of such analysis. Accordingly, detection efficiencies of click fraud may be improved over conventional techniques.

Figure 1A:
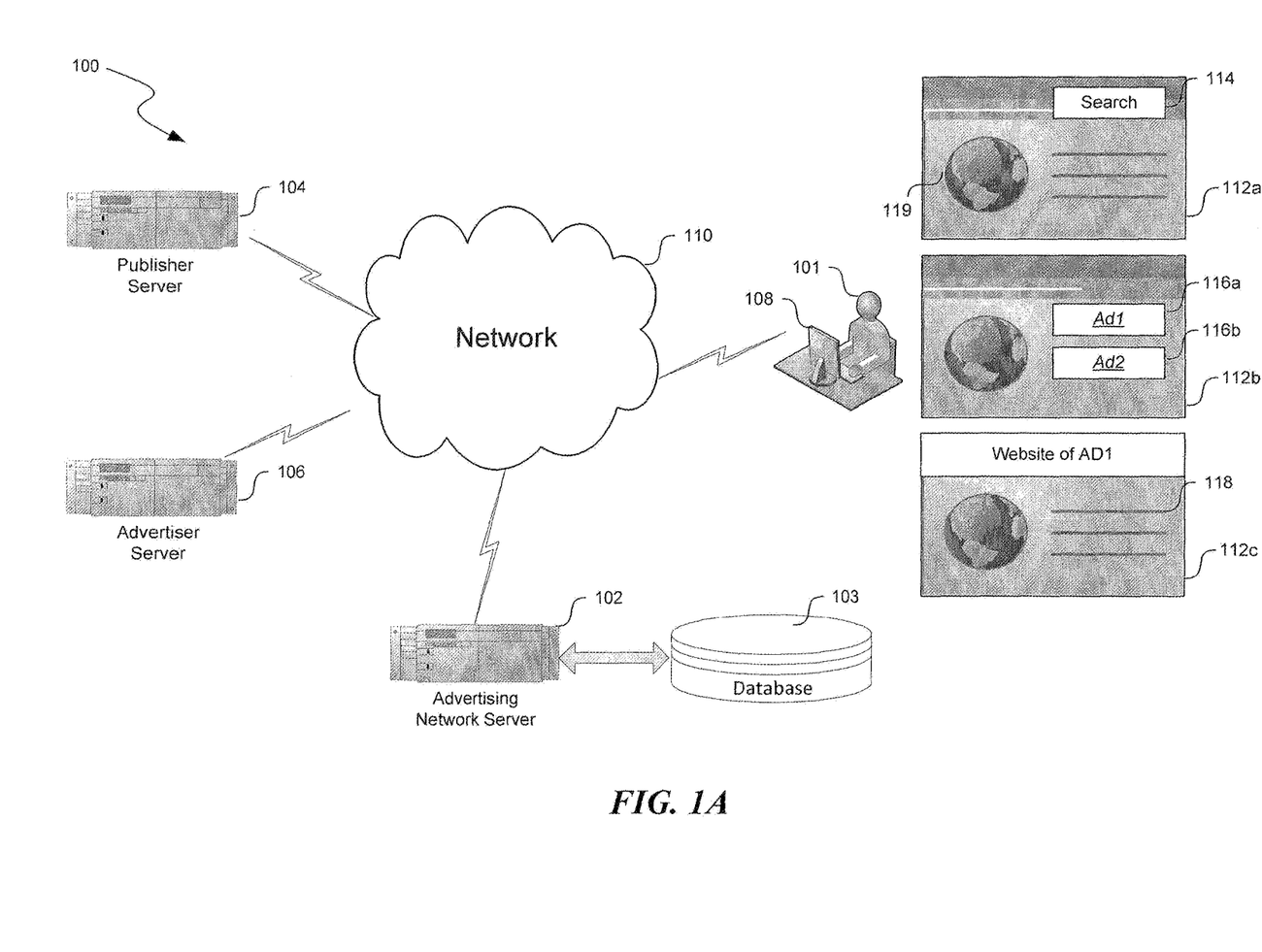
FIG. 1A is a schematic diagram illustrating a computing framework for an online advertising system in accordance with embodiments of the present technology.

FIG. 1A is a schematic diagram illustrating a computing framework 100 for an online advertising system in accordance with embodiments of the present technology. As shown in FIG. 1A, the computing framework 100 can include an advertising network server 102, a publisher server 104, an advertiser server 106, and a client device 108 (e.g., a personal computer) interconnected by a network 110. In one embodiment, the network 110 can be the Internet. In other embodiments, the network 110 can also include a personal area network, a local area network, a storage area network, a backbone network, a Metropolitan area network, a wide area network, a virtual private network, and/or other suitable types of network. Even though only the foregoing components are illustrated in FIG. 1A, in other embodiments, the computing framework 100 can also include additional servers, client devices, networking devices, and/or other suitable components.

In certain embodiments, the advertising network server 102, the publisher server 104, and the advertiser server 106 may be independent from one another. For example, an advertising network may provide the advertising network server 102. A website publisher may provide the publisher server 104, and a merchant may provide the advertiser's server 106. In other embodiments, at least some of the foregoing servers 102, 104, and 106 may be provided by a single entity. For example, an advertising network (e.g., Microsoft AdCenter®) can provide both the advertising network server 102 and the publisher server 104 when publishing own webpages (e.g., www.bing.com). An advertising network can provide all of the foregoing servers 102, 104, and 106. In further embodiments, the computing framework 100 may have other suitable arrangements.

The advertising network server 102, the publisher server 104, and the advertiser server 106 can individually include a web server, an application server, a catalog server, a communication server, and/or other suitable types of server. As shown in FIG. 1A, the advertising network server 102 can be operatively coupled to a database 103 storing advertisements, advertising campaigns, and/or other suitable advertising information. The database 103 can reside in read-only memory, random-access memory, magnetic disk storage media, optical storage media, flash memory devices, and/or other suitable storage media excluding propagated signals. The database 103 can also store advertising traffic information, as described in more detail below with reference to FIG. 2.

In operation, the advertising network server 102 can supply a user 101 with advertisements stored in the database 103 based on search requests from the user 101. For example, in one embodiment, the user 101 may send a webpage request (e.g., an HTTP request) to the publisher server 104 using the client device 108. In response, the publisher server 104 sends a first webpage 112a to the client device 108 via the network 110. As shown in FIG. 1A, the first webpage 112a can include a search field 114 and certain publisher content 119. The client device 108 then displays the received first webpage 112a to the user 101.

The user 101 can enter a search term (e.g., "car") in the search field 114 and sends a search request with the term to the publisher server 104. The publisher sever 104 redirects the received search request to the advertising network server 102, which retrieves relevant advertisements from the database 103 based on the search term. The advertising network server 102 then provides the retrieved advertisements to the publisher server 104.

The publisher server 104 then sends a second webpage 112b to the client device 108 in response to the search request. As shown in FIG. 1A, the second webpage 112b can include multiple clickable advertisements 116 (identified individually as AD1 116a and AD2 116b) with corresponding hyperlinks. The clickable advertisements can include descriptions and/or links to advertisers' websites that are related to the search term (e.g., a car manufacturer, a car dealership, a car buying service, etc.). Two advertisements AD1 116a and AD2 116b are shown in FIG. 1A for illustration purposes only. In other embodiments, the second webpage 112b can include one or any other suitable number of advertisements.

If the user 101 is interested in at least one of the advertisements 126, the user 101 can then cock on the displayed advertisement 116 for further information. For example, the user 101 may click on the displayed Ad1 116a to send a click request to the advertising network server 102. In response, the advertising network server 102 redirects the click request to the advertiser server 106. The advertiser server 106 then provides a third website 112c with corresponding advertiser content 118 to the client device 108.

Figure 1B:
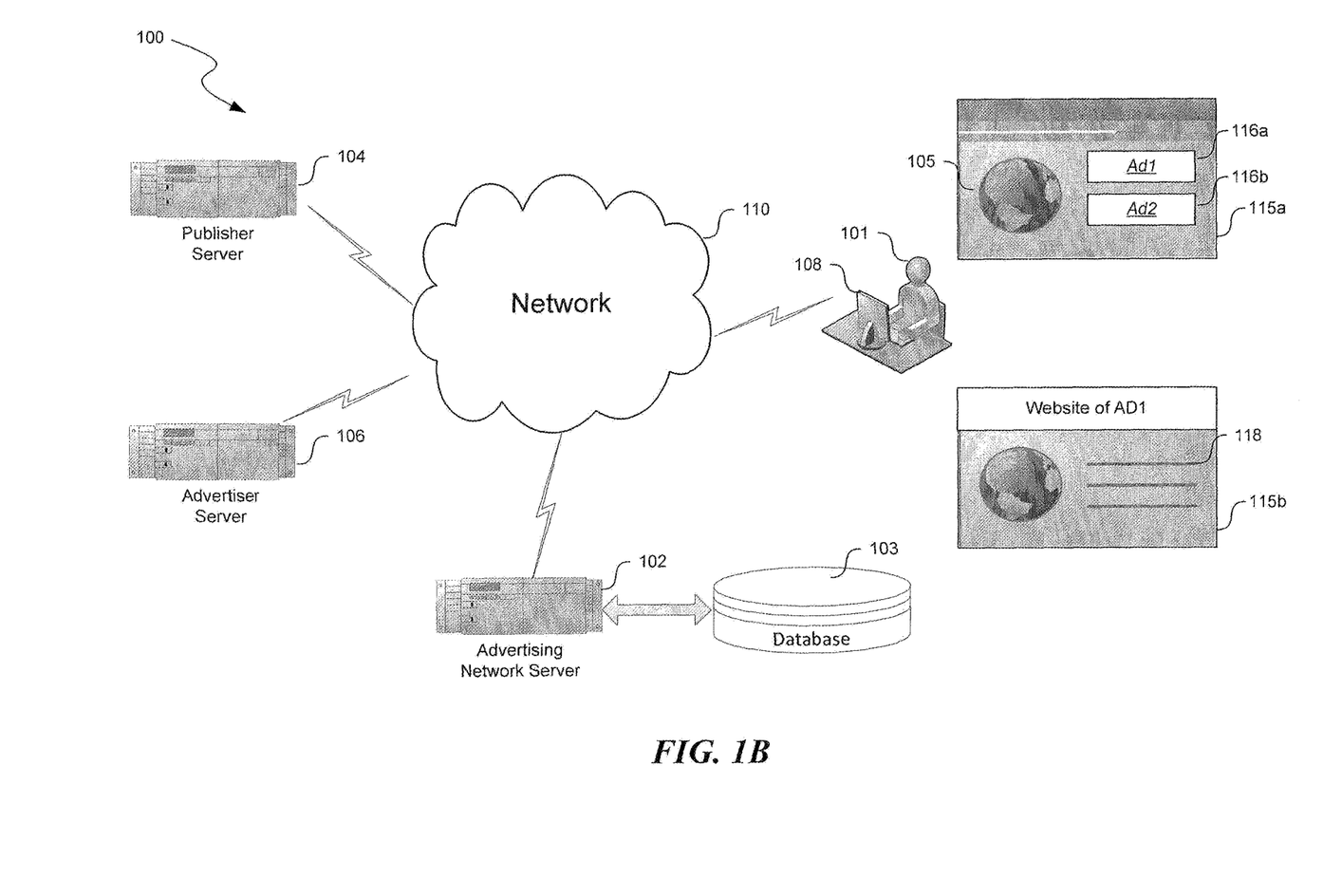
FIG. 1B is a schematic diagram illustrating a computing framework for an online advertising system in accordance with additional embodiments of the present technology.

In other embodiments, the advertising network server 102 can provide the user 101 with advertisements based on information other than the search requests. For example, as shown in FIG. 1B, after the publisher server 104 receives a webpage request from the user 101, the publisher server 104 then sends a search request with the requested content (or a summary thereof) to the advertising network server 102. In response, the advertising network server 102 retrieves relevant advertisements from the database 103 based on the requested content. The advertising network server 102 then provides the retrieved advertisements to the publisher server 104. In another example, the publisher server 104 can provide the requested webpage to the client device 108 along with an embedded advertisement request. The client device 108 then displays the requested webpage and executes the embedded advertisement request to retrieve relevant advertisements in the database 103 from the advertising network server 102.

The publisher server 104 then provides a content webpage 115a to the client device 108. The content webpage 115a includes the requested contents 105 and the advertisements 116. If the user 101 is interested in any of the advertisements 116, the user 101 can click on the displayed advertisements 116. For example, the user 101 may click on the displayed Ad1 116a to send a click request to the advertising network server 102. In response, the advertising network server 102 redirects the click request to the advertiser server 106. The advertiser server 106 then provides an advertiser webpage 115b with advertiser content 128 to the client device 108.

In any of the operational arrangements discussed above, the search request and corresponding response are generally referred to herein as an "impression path." The click request and corresponding response is generally referred to herein as a "click path." The advertising network server 102 can be configured to monitor and/or detect click fraud based on search and/or click requests along the impression and/or click paths, respectively, as described in more detail below with reference to FIGS. 2-6C.

Figure 2:
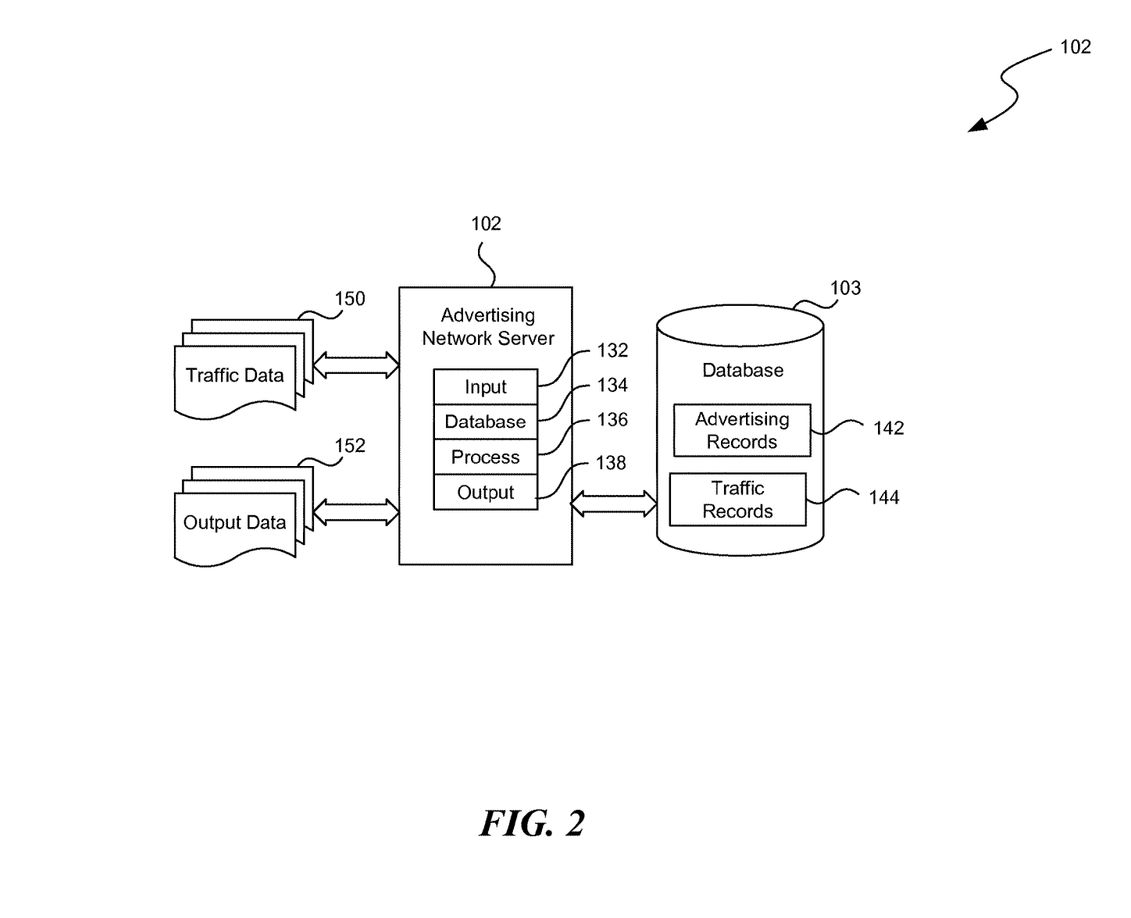
FIG. 2 is a block diagram showing computing components suitable for the advertising network server of FIG. 1A in accordance with embodiments of the present technology.

FIG. 2 is a block diagram showing computing system software components suitable for the advertising network server 102 in FIG. 1A or 1B in accordance with embodiments of the present technology. In FIG. 2 and in other Figures hereinafter, individual software components, modules, and routines may be a computer program, procedure, or process written as source code in C, C++, Java, and/or other suitable programming languages. The computer program, procedure, or process may be compiled into object or machine code and presented for execution by a processor of a personal computer, a network server, a laptop computer, a smart phone, and/or other suitable computing devices. Various implementations of the source and/or object code and associated data may be stored in a computer memory that includes read-only memory, random-access memory, magnetic disk storage media, optical storage media, flash memory devices, and/or other suitable storage media excluding propagated signals.

As shown in FIG. 2, the input component 132 may accept communication traffic data 150, such as search requests and click requests from the user 101 (FIG. 1A or 1B), and communicates the accepted information to other components for further processing. The database component 134 organizes records, including advertising records 142 (e.g., advertisements and advertising campaigns) and traffic records (e.g., client IDs corresponding to search requests), and facilitates storing and retrieving of these records to and from the database 103. Any type of database organization may be utilized, including a flat file system, hierarchical database, relational database, or distributed database, such as provided by a database vendor such as the Microsoft Corporation, Redmond, Wash. The process component 136 analyzes the traffic data 150, and the output component 138 generates output data 152 based on the analyzed traffic data 150. Embodiments of the process component 136 are described in more detail below with reference to FIG. 3.

Even though only particular components of the advertising network server 102 are shown in FIG. 2, in other embodiments, the advertising network server 102 can also include a bi-directional interface, a keyword processor, an index processor, a listing processor, a network load balancer, a redirect processor, and/or other suitable components. In further embodiments, the advertising network server 102 can include multiple interconnected servers configured to perform keyword analysis, indexing, listing, redirecting, and/or other suitable tasks.

Figure 3:
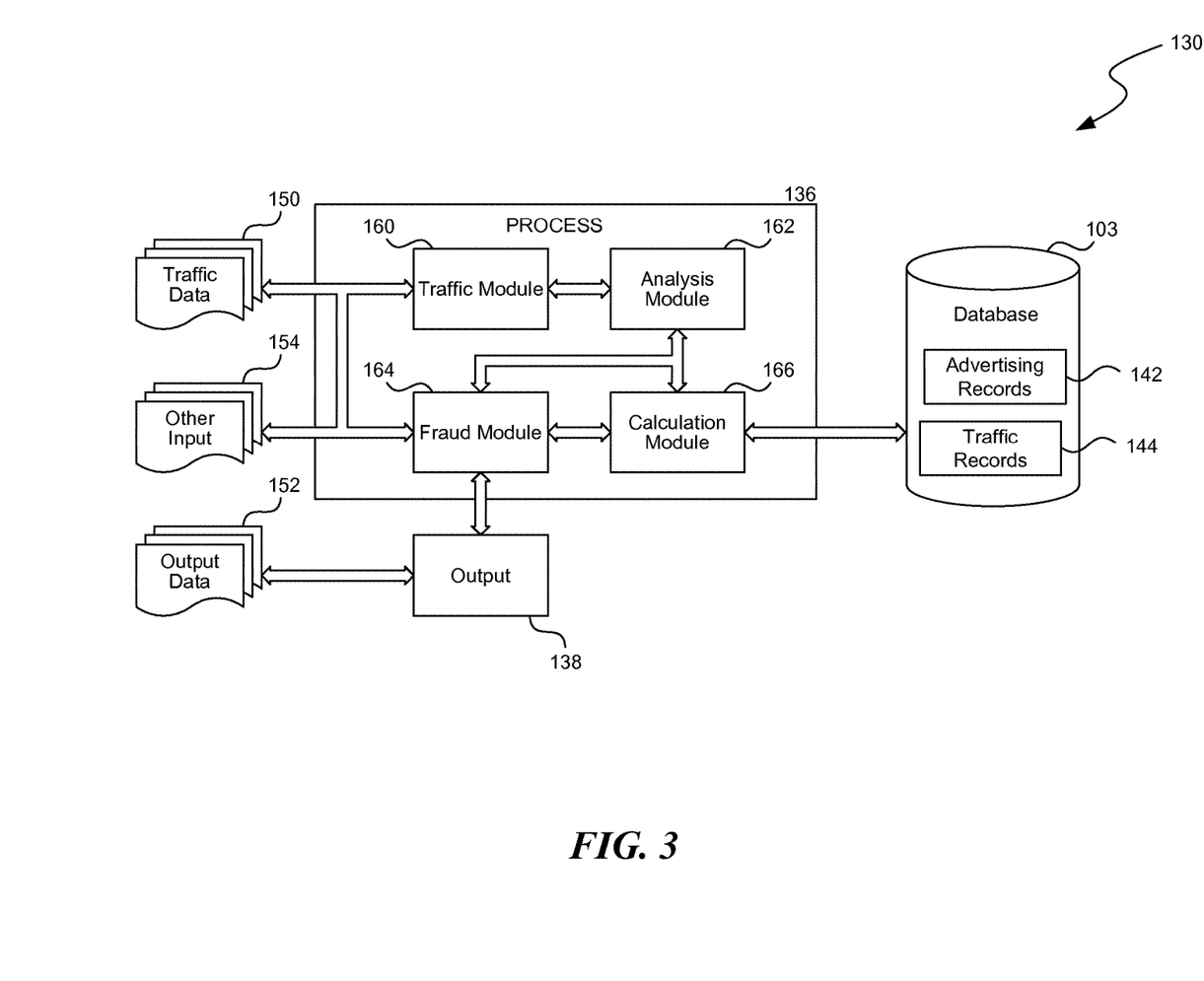
FIG. 3 is a block diagram showing software modules suitable for the process component in FIG. 2 in accordance with embodiments of the present technology.

FIG. 3 is a block diagram showing software modules 130 suitable for the process component 136 in FIG. 2 in accordance with embodiments of the present technology. As shown in FIG. 3, the process component 136 can include a traffic module 160, an analysis module 162, a fraud module 164, and a calculation module 166 interconnected with one other. Each module may be a computer program, procedure, or routine written as source code in a conventional programming language, or one or more modules may be hardware modules.

The traffic module 160 is configured to identify and analyze communication traffic data 150. For example, the traffic module 160 may monitor communication traffic in HTTP protocol and identify search and/or click requests from the client device 108 or the publisher server 104 (FIG. 1A). The identified requests may then be converted into traffic records 144 and/or other suitable data stored in the database 103. The traffic module 160 may have routines including, for example, comparison, character parsing, or other suitable routines.

The analysis module 162 may be configured to analyze the identified search and/or click requests from the traffic module 160 and to determine various attributes of the identified requests. For example, in one embodiment, the analysis module 162 is configured to determine whether the identified requests include a corresponding client ID. In another embodiment, the analysis module 162 is configured to determine whether the identified requests include a publisher ID, an advertiser ID, a corresponding IP address, and/or other suitable attributes. In further embodiments, the analysis module 162 may be configured to compare a client ID of a request to a client ID of previously observed requests that correspond to a particular IP address. The analysis module 162 can than supply the analysis results to the calculation module 166 for further processing.

The calculation module 166 can include counters, timers, and/or other suitable accumulation routines configured to perform various types of calculations to facilitate operation of other modules. For example, in one embodiment, the calculation module 166 may include a counter configured to track a number of client IDs that correspond to a particular IP address. In another example, the calculation module 166 may include a counter configured to track a number of requests with a particular client ID. In yet another embodiment, the calculation module 166 may include first and second counters configured to track a number of requests with client IDs and anonymous requests for a publisher (or advertiser), respectively. The calculation module 166 may further include a divider configured to determine a ratio and/or percentage of the requests with client IDs and anonymous requests.

The fraud module 164 may be configured to monitor and/or detect click fraud based on inputs from the analysis module 162, the calculation module 166, or other input 154 (e.g., offline manual input). For example, in certain embodiments, the fraud module 164 can include comparison routines configured to compare at least one the following parameters to a corresponding threshold:
- a number of client IDs corresponding to an IP address
- a number of requests corresponding to a particular client ID
- a ratio and/or percentage of the requests with client IDs and anonymous requests for a publisher
- a ratio and/or percentage of the requests with client IDs and anonymous requests for an advertiser If any of the comparisons indicate that the corresponding threshold has been exceeded, the fraud module 164 can indicate to the output component 138 that the request is invalid, the IP address is malicious, and/or can perform other suitable operations.

Figure 4A:
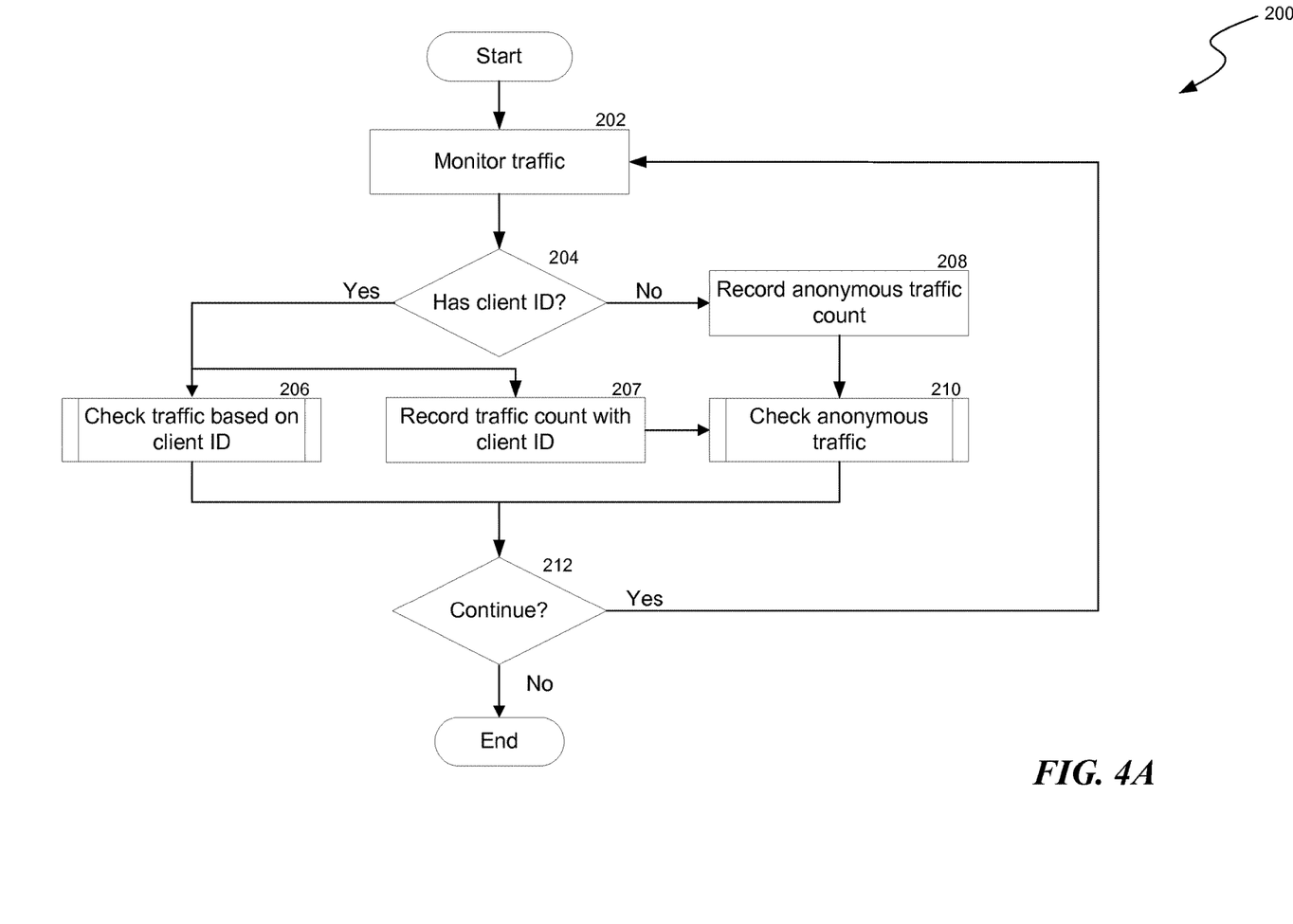
FIG. 4A is a flow diagram illustrating a process for monitoring click fraud in accordance with embodiments of the present technology.

FIG. 4A is a flowchart showing a process 200 for monitoring click fraud in accordance with embodiments of the present technology. Even though the method 200 is described below with reference to the computing framework 100 of FIGS. 1A, 1B and the software components/modules of FIGS. 2 and 3, the method 200 may also be applied in other systems with additional or different hardware and/or software components.

As shown in FIG. 4A, the process 200 includes a block 202 of monitoring communication traffic received at the advertising network server 102 (FIG. 1A). In one embodiment, the advertising network server 102 can monitor and analyze a browser request (e.g., a search or click request) for at least the following attributes:

Client ID
Publisher ID
Advertiser ID
IP address
Host domain

In other embodiments, the advertising network server 102 can also monitor and/or analyze domain classes, referrers, and/or other suitable attributes of web traffic. In further embodiments, the monitoring and/or analyzing may be performed by other servers, processors, and/or suitable components separate from the advertising network server 102.

The process 200 can include a decision block 204 to determine whether the received request includes a client ID. If the received request includes a client ID (e.g., a cookie), the process 200 proceeds to checking traffic based on client ID at block 206 and recording traffic count with client ID at block 207. An example request with a cookie is shown below for illustration purposes:

GET/spec.html HTTP/1.1
Host: www.example.org
Cookie: cookie1=value1; cookie2=value2
Accept: */*

As shown above, the example request is send to a Host at www.example.org and includes two cookies (i.e., "cookie1" and "cookie2") with corresponding values (i.e., "value1" and "value2"). In other examples, the received request may include one or any other suitable number of cookies and/or other suitable types of client ID.

If the received request does not include a client ID (e.g., in the example request above, the "Cookie" and "Accept" lines are omitted), the process 200 proceeds to recording anonymous traffic count based on publisher ID, advertiser ID, and/or other suitable attributes of the received request at block 208. In other embodiments, the determination may be based on other suitable criteria.

At block 206, the process 200 includes checking the received request based on a client ID. In one embodiment, the process 200 includes checking a number of requests received in a period of time (e.g., one day) for a particular client ID. If the number of requests exceeds a predetermined threshold, the process 200 may indicate that the received request is invalid, as described in more detail below with reference to FIG. 5A. In another embodiment, the process 200 includes checking a number of client IDs that correspond to a particular IP address in a period (e.g., one day). If the number of client IDs exceeds a predetermined threshold, the process 200 may indicate that the received request is invalid and optionally, may indicate the IP address as malicious, as described in more detail below with reference to FIG. 5B. In other embodiments, the process 200 may check the received request based on the client ID based on other suitable criteria.

At block 207, the process 200 includes recording traffic count with client ID. In one embodiment, the process 200 includes incrementing a publisher ID counter for a particular publisher (e.g., CNN.com) when the received request has a publisher ID identifying the publisher. In another embodiment, the process 200 includes incrementing an advertiser ID counter for a particular advertiser (e.g., Gap.com) when the received request has an advertiser ID identifying the advertiser. In other embodiment, the process 200 may also incrementing an overall ID counter irrespective of the publisher ID and the advertiser ID.

At block 208, the process 200 includes recording anonymous traffic count. In one embodiment, the process 200 includes incrementing an anonymous publisher counter for a particular publisher (e.g., CNN.com) when the received request has a publisher ID identifying the publisher. In another embodiment, the process 200 includes incrementing an anonymous advertiser counter for a particular advertiser (e.g., Gap.com) when the received request has an advertiser ID identifying the advertiser. In other embodiment, the process 200 may also incrementing an overall anonymous counter irrespective of the publisher ID and the advertiser ID.

The process 200 then proceeds to block 210 for checking anonymous traffic. In one embodiment, process 200 includes calculating a ratio and/or percentage of anonymous requests (e.g., based on the anonymous publisher counter) to those with client IDs (e.g., based on the publisher ID counter) for a publisher. In another embodiment, process 200 includes calculating a ratio and/or percentage of anonymous requests (e.g., based on the anonymous advertiser counter) to those with client IDs (e.g., based on the advertiser ID counter) for an advertiser. In other embodiments, process 200 includes calculating an overall ratio and/or percentage of anonymous requests (e.g., based on the overall anonymous counter) to those with client IDs (e.g., based on the overall ID counter). If the calculated ratios and/or percentages exceed corresponding thresholds, the process 200 may raise an alarm, mark the received request as potentially invalid, and/or perform other suitable functions. Several embodiments of checking anonymous traffic are described in more detail below with reference to FIGS. 6A-6C.

The process 200 then includes a decision block 212 to determine whether the process should continue. In one embodiment, the process 200 continues if additional requests are received. In other embodiments, the process 200 may continue based on other suitable conditions. As a result, the process reverts to monitoring communication traffic at block 202. Otherwise, the process ends.

Figure 4B:
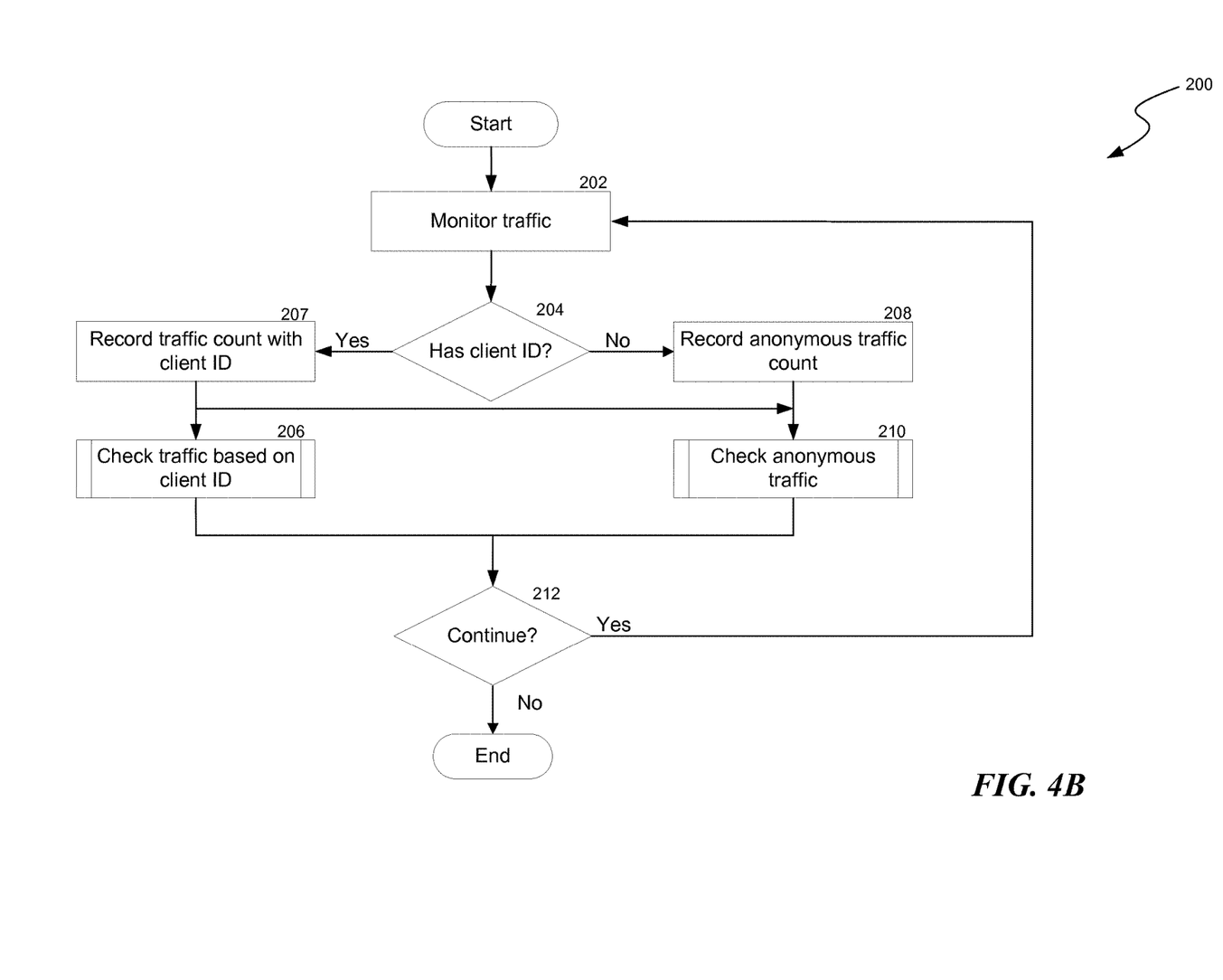
FIG. 4B is a flow diagram illustrating another process for monitoring click fraud in accordance with embodiments of the present technology.

In FIG. 4A, the operations of recording traffic count with client ID at block 207 and checking traffic based on client ID at block 206 are shown as parallel to each other. In other embodiments, the foregoing operations may have other performance sequences. For example, as shown in FIG. 4B, recording traffic count with client ID at block 207 and checking traffic based on client ID at block 206 may be performed in series. In further embodiments, the process 200 may include other suitable operations and/or sequences.

Figure 5A:
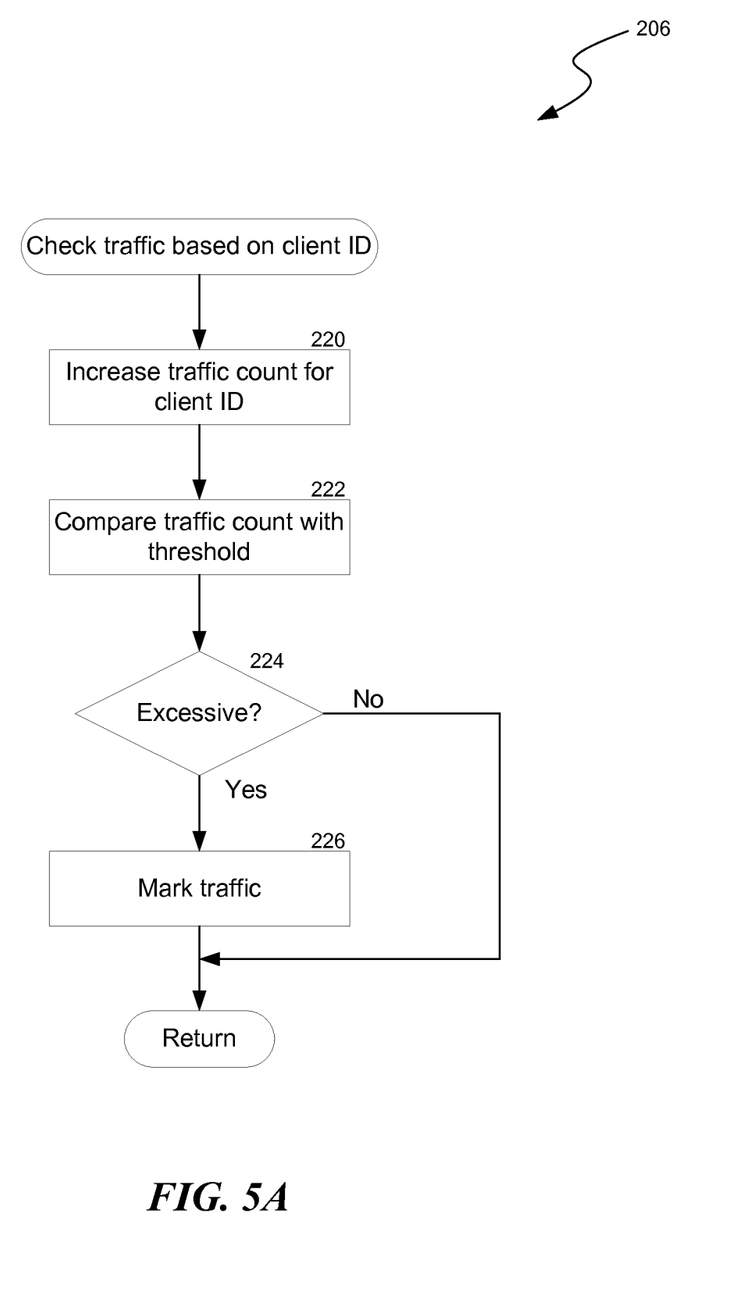
FIG. 5A is a flow diagram illustrating a process for checking traffic based on client identification in accordance with embodiments of the present technology.

FIG. 5A is a flow diagram illustrating a process 206 for checking traffic based on client ID in accordance with embodiments of the present technology. As described above with reference to FIGS. 4A and 4B, the process 206 may be a subroutine of the process 200 of FIG. 4A or 4B. As shown in FIG. 5A, the process 206 includes increasing (e.g., by one or other suitable increments) a traffic count for the identified client ID at block 220. The process 206 then includes comparing the accumulated traffic count with a predetermined threshold at block 222. In one embodiment, the predetermined threshold may be set based on previously observed accumulated counts over a period. In another embodiment, the predetermined threshold may be set manually. In further embodiments, the predetermined threshold may be set based on a combination of previously observed accumulated counts and other suitable parameters.

The process 206 then includes a decision block 224 to determine if the accumulated traffic count exceeds the predetermined threshold. If the predetermined threshold is not exceeded, the process 206 returns to process 200 in FIG. 4A or 4B. If the predetermined threshold is exceeded, the process 206 includes marking the received request at block 226. In one embodiment, the received request may be marked as invalid. In another embodiment, the received request may be marked as suspicious and requiring further inspection (e.g., by an operator). In further embodiments, the received request may be marked in other suitable fashion. Subsequently, the process 206 returns to process 200 in FIG. 4A or 4B.

Figure 5B:
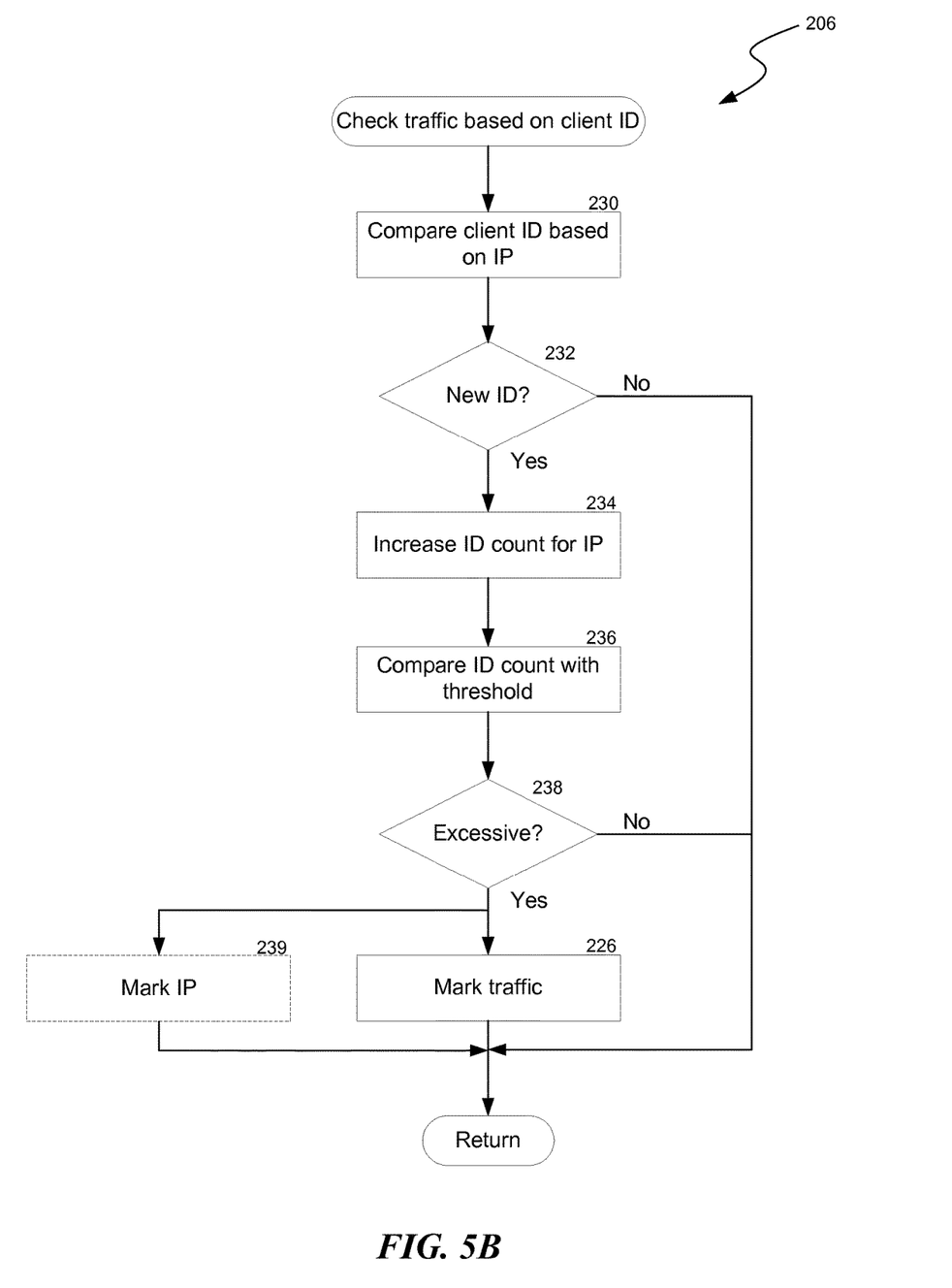
FIG. 5B is a flow diagram illustrating a process for checking traffic based on client identification and requesting source address in accordance with embodiments of the present technology.

FIG. 5B is a flow diagram illustrating another process 206 for checking traffic based on client ID and requesting source address in accordance with embodiments of the present technology. As shown in FIG. 5B, the process 206 includes comparing the client ID of the received request to that previously observed to correspond to the source address (e.g., IP address) of the received request at block 230. The process 206 then includes a decision block 232 to determine if the client ID of the received request is new and/or otherwise different from that previously observed. If the client ID is not new, the process 206 returns to process 200 in FIG. 4A or 4B.

If the client ID is new, the process 206 includes increasing (e.g., by one or other suitable increments) an ID count for the particular source address at block 234. The process 206 then includes comparing the accumulated ID count with a predetermined threshold at block 236. In one embodiment, the predetermined threshold may be set based on previously observed accumulated ID counts over a period. In another embodiment, the predetermined threshold may be set manually. In further embodiments, the predetermined threshold may be set based on a combination of previously observed accumulated ID counts and other suitable parameters.

The process 206 then includes a decision block 238 to determine if the accumulated ID count exceeds the predetermined threshold. If the predetermined threshold is not exceeded, the process 206 returns to process 200 in FIG. 4A or 4B. If the predetermined threshold is exceeded, the process 206 includes marking the received request at block 226, as discussed above with reference to FIG. 5A. Optionally, the process 206 can also include marking the source address as potentially malicious at block 239. Subsequently, the process 206 returns to process 200 in FIG. 4A or 4B.

Figure 6A:
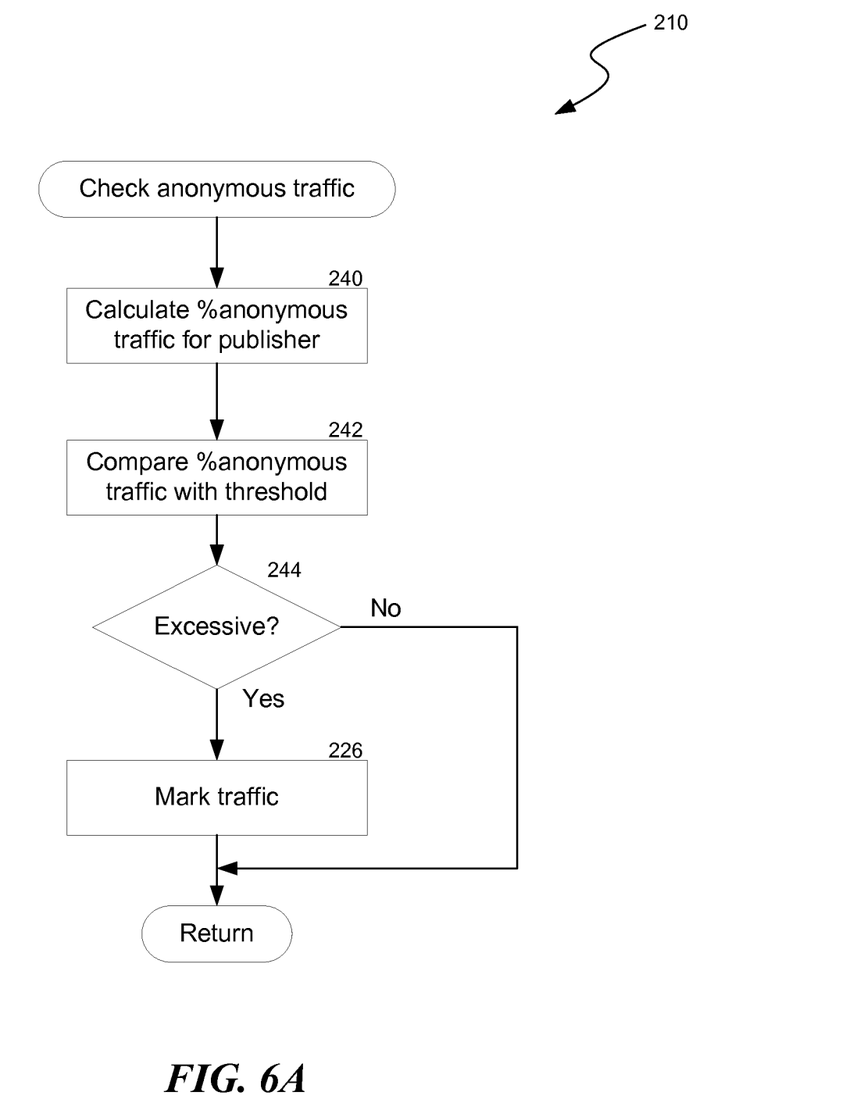
FIG. 6A is a flow diagram illustrating a process for checking anonymous traffic for a publisher in accordance with embodiments of the present technology.

FIG. 6A is a flow diagram illustrating a process 210 for checking anonymous traffic for a publisher in accordance with embodiments of the present technology. As described above with reference to FIGS. 4A and 4B, the process 210 may be a subroutine of the process 200 of FIG. 4A or 4B. As shown in FIG. 6A, the process 210 includes calculating a ratio and/or percentage of anonymous traffic for a publisher identified by the publisher ID in the received request at block 240. In one embodiment, the ratio and/or percentage may be calculated based on the accumulated values of the publisher ID counter and the anonymous publisher counter. In other embodiments, the ratio and/or percentage may be averaged over a period and/or otherwise calculated.

The process 210 then includes comparing the calculated ratio and/or percentage with a predetermined threshold at block 242. In one embodiment, the predetermined threshold may be set based on previously observed values. In another embodiment, the predetermined threshold may be set manually. In further embodiments, the predetermined threshold may be set based on a combination of previously observed values and other suitable parameters.

The process 210 then includes a decision block 244 to determine if the calculated ratio and/or percentage exceed the predetermined threshold. If the predetermined threshold is not exceeded, the process 210 returns to process 200 in FIG. 4A or 4B. If the predetermined threshold is exceeded, the process 210 includes marking the received request at block 226, as discussed above with reference to FIG. 5A. Subsequently, the process 210 returns to process 200 in FIG. 4A or 4B.

Figure 6B:
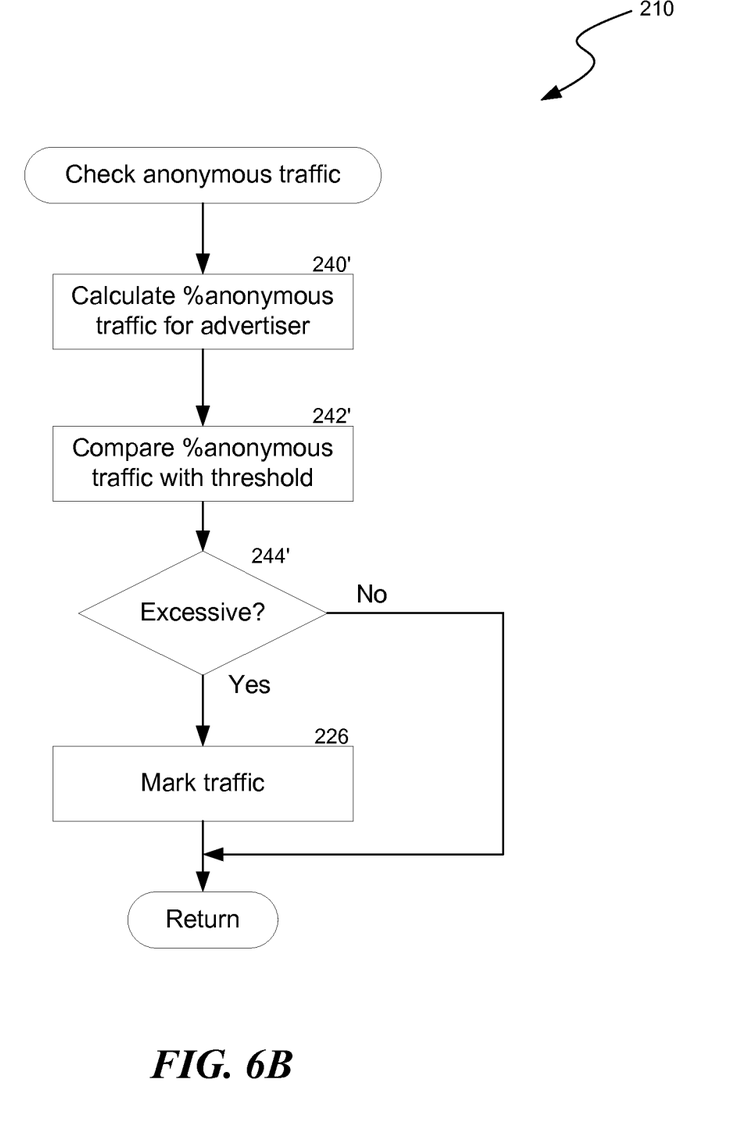
FIG. 6B is a flow diagram illustrating a process for checking anonymous traffic for an advertiser in accordance with embodiments of the present technology.

FIG. 6B is a flow diagram illustrating a process 210 for checking anonymous traffic for an advertiser in accordance with embodiments of the present technology. The operations of process 210 shown in FIG. 6B are generally similar to those in FIG. 6A except that the operations are performed based on the advertiser instead of the publisher. As a result, corresponding operations are identified with an apostrophe and are omitted here for clarity. Even though the process 210 is described above based on publisher ID and advertiser ID, in other embodiments, the process 210 can be based on a host domain, subdomain, and/or other suitable identifiers.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A computer implemented method performed by a computing device having a processor, comprising:
    with the processor,
        receiving electronic data representing first and second browser requests via the Internet, each of the first and second browser requests received from a browser executing on a client device;
        determining that the first browser request does not include any client ID containing information for identifying the browser on the client device from which the first browser request is received;
        determining that the second browser request includes a client ID containing information for identifying the browser on the client device from which the second browser request is received;
        determining that the first browser request includes an advertiser ID identifying an advertiser;
        determining that the second browser request includes the advertiser ID identifying the advertiser;
        determining excessive anonymous traffic to the advertiser identified by the advertiser ID in the first and second browser requests;
        wherein said determining excessive anonymous traffic includes:
            incrementing an anonymous advertiser counter for the advertiser in response to the first browser request, wherein the anonymous advertiser counter represents a number of browser requests in a first group of received browser requests, wherein each browser request in the first group does not include any client ID and includes the advertiser ID;
            incrementing an advertiser counter for the advertiser in response to the second browser request, wherein the advertiser counter represents a number of browser requests in a second group of received browser requests, wherein each browser request in the second group includes a client ID and the advertiser ID;
calculating a ratio of anonymous traffic by dividing the number of browser requests in the first group by the number of browser requests in the second group; and
determining that the calculated ratio of anonymous traffic is greater than a threshold; and
the method further comprising: in response to said determining excessive anonymous traffic to the advertiser, marking the first browser request as invalid.

2. The computer implemented method of claim 1 further comprising:
increasing a traffic count in response to receiving the second browser request, wherein the traffic count represents a number of received browser requests having the same client ID as the client ID of the second browser request;
comparing the traffic count with a traffic count threshold; and
in response to the traffic count exceeds the traffic count threshold, marking the second browser request as invalid.

3. The computer implemented method of claim 1, the second browser request including an originating IP address, the method further comprising:
comparing the client ID of the second browser request with a client ID of a previously received browser request observed to correspond to the same originating IP address;
in response to that the client ID of the second browser request is different than the client ID of the previously received browser request, increasing a client ID count for the originating IP address;
comparing the client ID count with a threshold; and
in response to that the client ID count exceeds the threshold, marking the second browser request as invalid or marking the originating IP address as malicious.

4. The computer implemented method of claim 1, wherein the first browser request is received from a first browser executing on a first client device, and the second browser request is received from a second browser executing on a second client device.

5. The computer implemented method of claim 1, further comprising checking for excessive traffic corresponding to the client ID based on a client ID count corresponding to an IP address associated with the second browser request.

6. The computer implemented method of claim 5, further comprising recording traffic count with the client ID in parallel with said checking for excessive traffic corresponding to the client ID.

7. The computer implemented method of claim 5, further comprising recording traffic count with the client ID in series with said checking for excessive traffic corresponding to the client ID.

8. The computer implemented method of claim 1, further comprising checking for excessive traffic corresponding to the client ID by checking a number of requests received in a period of time for said client ID.

9. The computer implemented method of claim 1, further comprising checking for excessive traffic corresponding to the client ID by checking a number of client IDs corresponding to an originating IP address of the second browser request during a time period.

10. An apparatus comprising a processor and a memory storing instructions for causing the processor to:
receive electronic data representing first and second browser requests via the Internet, each of the first and second browser requests received from a browser executing on a client device;
determine that the first browser request does not include any client ID containing information for identifying the browser on the client device from which the first browser request is received;
determine that the second browser request includes a client ID containing information for identifying the browser on the client device from which the second browser request is received;
determine the first browser request includes an advertiser ID identifying an advertiser;
determine the second browser request includes the advertiser ID identifying the advertiser;
determine excessive anonymous traffic to the advertiser identified by the advertiser ID in the first and second browser requests;
wherein the instructions for causing the processor to determine excessive anonymous traffic include instructions for causing the processor to:
increment an anonymous advertiser counter for the advertiser in response to the first browser request, wherein the anonymous advertiser counter represents a number of browser requests in a first group of received browser requests, wherein each browser request in the first group does not include any client ID and includes the advertiser ID;
increment an advertiser counter for the advertiser in response to the second browser request, wherein the advertiser counter represents a number of browser requests in a second group of received browser requests, wherein each browser request in the second group includes a client ID and the advertiser ID;
calculate a ratio of anonymous traffic by dividing the number of browser requests in the first group by the number of browser requests in the second group; and
determine the calculated ratio of anonymous traffic is greater than a threshold; and
the memory further storing instructions for causing the processor to: in response to determining excessive anonymous traffic to the advertiser, mark the first browser request as invalid.

11. The apparatus of claim 10, the memory further storing instructions for causing the processor to:
increase a traffic count in response to receiving the second browser request, wherein the traffic count represents a number of received browser requests having the same client ID as the client ID of the second browser request;
compare the traffic count with a traffic count threshold; and
in response to the traffic count exceeds the traffic count threshold, mark the second browser request as invalid.

12. The apparatus of claim 10, the second browser request including an originating IP address, the memory further storing instructions for causing the processor to:
compare the client ID of the second browser request with a client ID of a previously received browser request observed to correspond to the same originating IP address;
in response to that the client ID of the second browser request is different than the client ID of the previously received browser request, increasing a client ID count for the originating IP address;

compare the client ID count with a threshold; and in response to that the client ID count exceeds the threshold, mark the second browser request as invalid or marking the originating IP address as malicious.

13. The apparatus of claim 10, the memory further storing instructions for checking for excessive traffic corresponding to the client ID based on a client ID count corresponding to an IP address associated with the second browser request.

14. The apparatus of claim 13, the memory further storing instructions for causing the processor to record traffic count with the client ID in parallel with checking for excessive traffic corresponding to the client ID.

15. The apparatus of claim 13, the memory further storing instructions for causing the processor to record traffic count with the client ID in series with checking for excessive traffic corresponding to the client ID.

16. The apparatus of claim 10, the memory further storing instructions for checking a number of requests received in a period of time for said client ID.

17. The apparatus of claim 10, the memory further storing instructions for causing the processor to check for excessive traffic corresponding to the client ID by checking a number of client IDs corresponding to a particular IP address during a time period.

* * * * *